Oct. 30, 1962     E. K. STODOLA     3,061,197
AUTOMATIC TEMPERATURE RELATION CONTROL SYSTEMS
Filed May 20, 1957
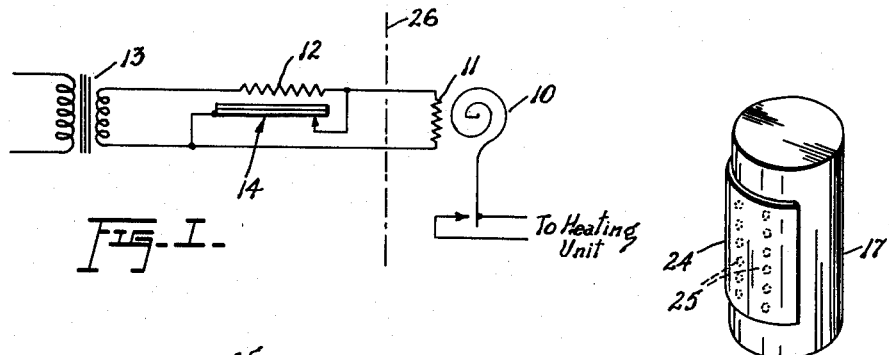
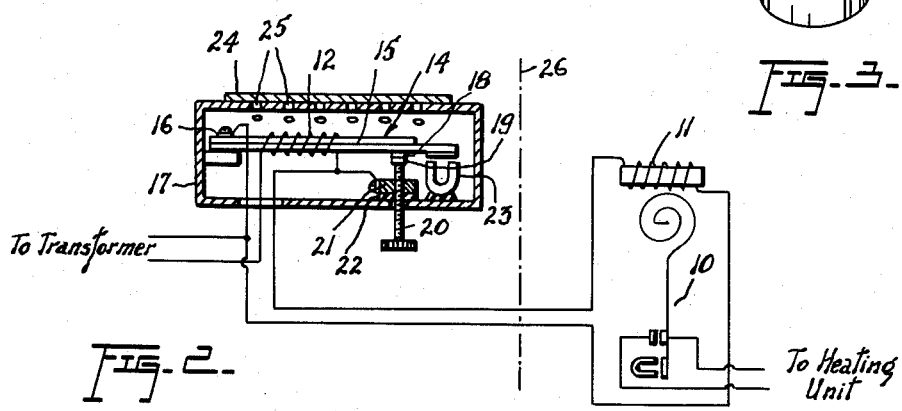
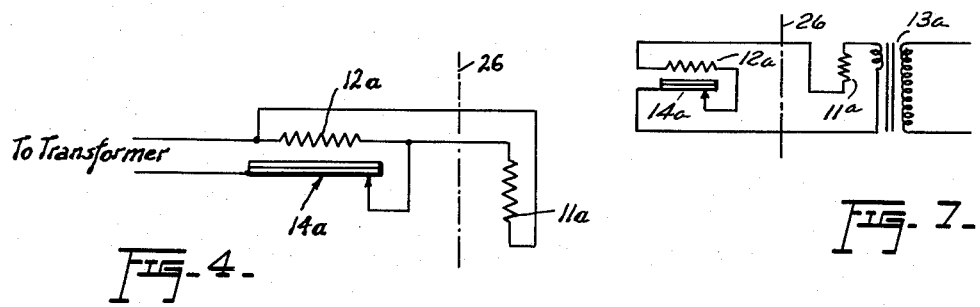
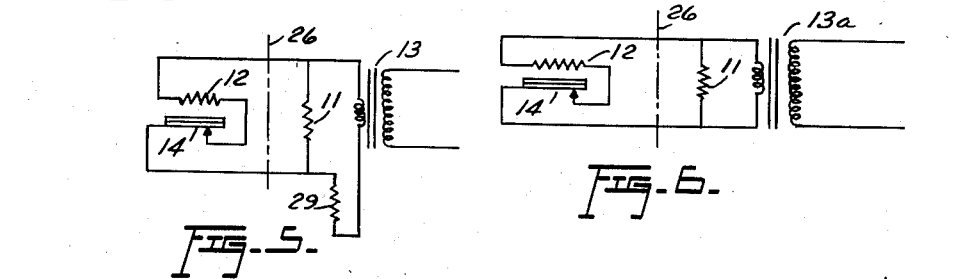
Inventor:
Edwin King Stodola United States Patent Office 3,061,197
Patented Oct. 30, 1962

3,061,197
AUTOMATIC TEMPERATURE RELATION
CONTROL SYSTEMS
Edwin King Stodola, 118 Stanton Road, Northport, N.Y.
Filed May 20, 1957, Ser. No. 660,171
11 Claims. (Cl. 236—68)

This invention relates to new and useful improvements in temperature control systems, and in particular the invention concerns itself with space heating or cooling systems wherein the operation of a heating or cooling unit is controlled by an indoor thermostat.

The principal object of the invention is to afford more efficient and comfortable heating or cooling of an indoor space than is ordinarily possible under the control of the indoor thermostat, this being attained by taking into consideration the prevailing outdoor temperature, wind conditions and heat radiation from the sun, and coordinating the same with the operation of the indoor thermostat so that the heating or cooling unit controlled by the latter is responsive to a coefficient of both indoor and outdoor temperatures and other weather conditions.

As such, an important feature of the invention resides in the provision of means for raising the temperature in the immediate vicinity of the indoor thermostat to a point above the surrounding indoor temperature when the prevailing outdoor temperature is such as to make desirable the energization of the heating or cooling unit at a room temperature higher or lower than that at which the same would be energized if the invention were not present, so that a greater heating or cooling effect is derived for proper comfort.

Another important feature of the invention resides in the provision of means for adjusting the aforementioned temperature raising means to respond to wind conditions as well as outdoor temperature and sun heat, whereby to compensate for drafts, etc., which conventional control systems, particularly those associated with heating units, do not take into consideration.

Some of the advantages of the invention reside in its simplicity of construction, efficient operation, and in its adaptability for use in heating as well as cooling systems of various types.

With the foregoing more important objects and features in view and such other objects and features as may become apparent as this specification proceeds, the invention will be understood from the following description taken in conjunction with the accompanying drawing, wherein like characters of reference are used to designate like parts, and wherein:

FIGURE 1 is a wiring diagram of an embodiment of the invention for use in a heating system;

FIGURE 2 is a diagrammatic view thereof, with the outdoor thermostat and its windshield being shown structurally in section;

FIGURE 3 is a perspective view of the adjustable windshield;

FIGURE 4 is a wiring diagram of a modified embodiment of the invention for use in a cooling system;

FIGURE 5 is a wiring diagram of another modified embodiment of the invention;

FIGURE 6 is a wiring diagram of another modified embodiment thereof; and

FIGURE 7 is a wiring diagram of another modified embodiment of the invention.

Referring now to the accompanying drawing in detail, particularly to FIGURES 1–3 inclusive, the temperature control system shown herein is especially intended for use with a heating system such as a furnace, or the like (not shown), the operation of which is controlled by an indoor thermostat 10.

In order that such a heating unit or furnace may be controlled in response to a coefficient of indoor as well as outdoor temperature, the invention contemplates the provision of a heating element 11 which is suitably mounted adjacent the indoor thermostat 10, so that when the heating element 11 is energized, the temperature surrounding the indoor thermostat is higher than the actual indoor or room temperature and the heating unit or furnace is energized at a lower room temperature than it would be if the invention were not present.

The heating element 11 is connected in series with a resistor 12 to a source of current, such as the secondary winding of a suitable transformer 13, and an outdoor thermostat 14 is also provided, the same being connected in series with the resistor 12, as shown in FIGURE 1. The outdoor thermostat 14 includes a bimetallic strip 15, suitably mounted at one end thereof as at 16 in a housing 17 and having a contact 18 adjacent its other end, operatively engageable with a contact 19 carried by an adjusting screw 20. The screw 20 is supported by a block 21 insulated from the housing 17 as shown at 22 and, in accordance with conventional practice, a permanent magnet 23 may be provided for permitting the strip 15 to move with a snap-action in closing and opening of the contacts 18, 19.

The aforementioned resistor 12 is disposed adjacent the outdoor thermostat 14, preferably on the strip 15 itself, so that when the resistor is energized, the heat originating therefrom causes the strip 15 to flex and separate the contacts 18, 19, which are normally closed.

With the opening of the contacts 18, 19, the heating element 11 is added to the circuit and the resistance of the heating element is such as to reduce the current in the circuit sufficiently to permit the resistor 12 to cool and allow the strip 15 to close the contacts 18, 19. With the closing of the contacts, the resistor 12 will again become heated and this cycle will repeat itself periodically, with the ratio of the open time to the closed time of the contacts depending, among other things, on the outdoor temperature to which the thermostat 14 and the resistor 12 are exposed. In other words, when the outdoor temperature is relatively high, the contacts 18, 19 will be more open than closed and a relatively large amount of heat will be produced by the element 11. Alternatively, when the outdoor temperature is relatively low, the contacts will be more closed than open and a relatively small amount of heat will be produced by the element 11. Sun heat radiation falling on the outdoor thermostat will produce an effect similar to that produced by an elevation of the air temperature.

Accordingly, in the presence of relatively high outdoor temperature, the element 11 will maintain the indoor thermostat 10 at a relatively high point above the surrounding indoor temperature and, as a result, the heating unit controlled by the indoor thermostat will be energized only when the room temperature drops considerably below the point at which it would have been energized if the element 11 were not present, thus producing a relatively small heating effect. On the other hand, in the presence of relatively low outdoor temperature, the element 11 will heat the indoor thermostat 10 to a relatively low point above the surrounding indoor temperature, so that the temperature at the indoor thermostat is closer to the actual indoor temperature. As a result, the heating unit will be energized at a temperature closer to the temperature for which the indoor thermostat is set, thus producing a relatively large heating effect, as will be clearly apparent.

The aforementioned ratio of open time to closed time of the contacts 18, 19 depends not only on outdoor temperature and sun heat, but also on the circulation of air about the strip 15 and resistor 12. Thus, to avoid excessive effects in this regard due to wind, etc., the outdoor thermostat 14 and the resistor 12 are enclosed by the housing 17, so that the latter functions as a windshield and permits the temperature of the air in the housing 17 to be the primary factor in governing the opening and closing time of the contacts.

However, under some conditions the effect of wind is also desirable for controlling the system so that the indoor temperature is maintained at a comfortable degree in the presence of drafts created by outside wind. For this purpose, adjusting means are provided for the windshield 17, the same comprising a cover 24 which is adjustably secured in any suitable manner to the windshield or housing 17 so as to overlie a series of apertures or air passages 25 with which the housing is provided. The cover 24 may be altogether removed from the housing, if desired, for maximum air circulation, or placed thereon so as to cover all the apertures 25 for minimum air circulation. Alternatively, the cover may be applied to the housing so as to close only a certain number of the apertures, for adjustment of air circulation at any desired point between the maximum and minimum limits.

For purposes of illustration, the line 26 in the accompanying drawing designates a division between components of the system located outdoors, that is, at the left-hand side of the line, and those located indoors, at the right-hand side of the line. Apart from the addition of the resistor 12 to the outdoor thermostat 14 and the heating element 11 to the indoor thermostat 10, the thermostats 14, 10 may be of any suitable conventional type. The transformer need not necessarily be outdoors.

The accompanying FIGURE 4 illustrates a slightly modified form of the invention such as may be used in conjunction with a cooling unit rather than a heating unit. In this instance the heating element 11a and the resistor 12a are connected in parallel, but in series with the outdoor thermostat 14a to the transformer, so that when the thermostat is open, neither the heating element nor the resistor are energized. As in the instance of the thermostat 14, the thermostat 14a is normally closed and the relative resistances of the element 11a and resistor 12a are such that a comparatively large amount of heat is produced by the element 11a when the thermostat 14a is closed in the presence of comparatively low outside temperature. Conversely, in the presence of a comparatively high outside temperature, the thermostat 14a will be more open than closed, and a comparatively small amount of heat will be produced by the element 11a. It should be understood, of course, that the thermostat 14a periodically opens and closes under the influence of heat generated in the resistor 12a, as in the instance of the thermostat 14.

This arrangement effectively inverts the effect of the outdoor control system so that as the outside temperature rises, the temperature to which the cooling (or heating) system brings the space controlled by the thermostat 10 also rises. This is particularly desirable in cooling systems where it is not desired to have too great a contrast between indoor and outdoor temperatures.

In the presence of relatively low outdoor temperature, the relatively high amount of heat produced by the element 11a will heat the indoor thermostat to a relatively high point above surrounding indoor temperature and, as a result, the cooling unit controlled by the indoor thermostat will be energized at a temperature considerably below the actual indoor temperature for which the indoor thermostat is set. On the other hand, in the presence of relatively high outdoor temperature, the element 11a will heat the indoor thermostat to a relatively low point above the surrounding indoor temperature, so that the temperature at the indoor thermosat is closer to the actual indoor temperature. As a result, the cooling unit will be energized at a temperature closer to the temperature for which the indoor thermostat is set, thus causing the system to regulate the room to a relatively higher temperature.

If it is desirable to arrange the system so that only two wire connections are necessary to the outdoor thermostat, rather than three as shown in FIGURE 1, the arrangement illustrated in FIGURE 5 may be used. In this instance an impedance element 29 is inserted in series with the heating element 11 and the transformer 13, as shown. The outdoor thermostat contacts in series with the outdoor resistor 12 connect across the heating element 11, so that only two conductors are required to connect the outdoor thermostat and the resistor 12. Bearing in mind that the lower the outside temperature, the greater is the fraction of time when the outdoor thermostat 14 is closed, the resistor 12 shunts the heating element 11. Thus, that the greater the fraction of time when the thermostat 14 is closed, the lower is the amount of heat generated by the element 11, whereby the desired effect is produced. Although the element 29 is referred to as a resistive impedance, it may also be a reactance. As such, the reactance may be separate as shown in FIGURE 5, or may be embodied in the transformer 13, if the latter is of a high leakage reactance type, as indicated by the transformer 13a in FIGURE 6, wherein the transformer has inherent therein the requisite self-impedance for operation of the system.

Obviously, the windshield 17 with its air circulation adjusting means 24, 25, may be used, if desired, with the embodiments of FIGURES 5, 6 and 7 as well as with those of FIGURES 1–3 and 4.

For the cooling control system illustrated in FIGURE 4, two wire connections to the outdoor thermostatic element can be provided by simply connecting the heating element 11a in series with the resistor 12a, rather than in parallel therewith as shown in FIGURE 4, such a series connection being illustrated in FIGURE 7.

Thus, while in the foregoing there have been described and shown the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a heating system, the combination of an indoor thermostat adapted to actuate a heating unit at a predetermined degree of temperature, a heating element disposed adjacent said indoor thermostat for maintaining the same at a point above indoor temperature, an outdoor thermostat including a pair of contacts having a tendency to close as its temperature is reduced, and a resistor disposed adjacent said outdoor thermostat for periodically opening said contacts and permitting the same to close, said outdoor thermostat contacts being in series with said resistor and said heating element connected across said contacts, whereby the heating element may be energized when the outdoor thermostat is open and whereby the fraction of time when the outdoor thermostat is open is increased in response to an increase in outdoor temperature.

2. In a heating system, the combination of an indoor thermostat adapted to actuate a heating unit at a predetermined degree of temperature, a heating element disposed adjacent said indoor thermostat for maintaining the same at a point above indoor temperature, an outdoor thermostat including a pair of contacts having a tendency to close as the temperature of said outdoor thermostat is decreased, a resistor disposed adjacent said outdoor thermostat for periodically opening said pair of contacts and permitting the same to close, and a source of current connected to said outdoor thermostat and to said heating element, said resistor being connected in series with said pair of contacts in the outdoor thermostat to said source of current and said heating element being connected across said outdoor pair of contacts, whereby the heating element may be energized when the outdoor thermostat contacts are open and whereby the fraction of time when the outdoor thermostat contacts are open is increased in response to an increase in outdoor temperature.

3. In a heating system, the combination of an indoor thermostat adapted to actuate a heating unit at a predetermined degree of temperature, a heating element disposed adjacent said indoor thermostat for maintaining the same at a point above indoor temperature, an outdoor thermostat including a pair of contacts having a tendency to close as the temperature of said outdoor thermostat is reduced, and a resistor disposed adjacent said outdoor thermostat for periodically opening said pair of contacts and permitting the same to close, said resistor and said heating element being connected in series across a source of current and said pair of contacts of said outdoor thermostat being connected across said heating element, whereby the heating element may be energized when the outdoor thermostat contacts are open and whereby the fraction of the time when the outdoor thermostat contacts are open is increased in response to an increase in outdoor temperature.

4. In a heating system, the combination of an indoor thermostat adapted to actuate a heating unit at a predetermined degree of temperature, a heating element disposed adjacent said indoor thermostat for maintaining the same at a point above indoor temperature, an outdoor thermostat including a pair of contacts having a tendency to close as the temperature of said outdoor thermostat is reduced, a resistor disposed adjacent said outdoor thermostat for periodically opening said pair of contacts and permitting the same to close, and an auxiliary impedance connected in series with said heating element across a source of current, said pair of contacts of said outdoor thermostat and said resistor being connected in series across said heating element, whereby the heating element may be more intensely energized when the outdoor thermostat contacts are open and whereby the fraction of the time when the outdoor thermostat contacts are open is increased in response to an increase in outdoor temperature.

5. In a temperature control system for controlling the operation of a space conditioning device in response to space temperature and varying the space temperature in accordance with a schedule as outdoor weather conditions change, space temperature responsive switch means, means adapted to connect said switch means to control the space conditioning device, first heating means for heating said temperature responsive means, second temperature responsive switch means, second heating means adapted for heating said second temperature responsive switch means, said second switch means and its heating means being mounted as a unit outdoors so that its heat loss is a function of outdoor weather conditions, a source of power, connection means including said second switch means connecting said second heating means to source so that said unit is normally maintained near a selected temperature and the percent on time of said second switch means depends upon the outdoor temperature and the wind velocity, connection means connecting said first heating means in parallel with said second switch means so that each time said second switch means is open heat is applied to said space temperature responsive means to reset the space temperature as a function of outdoor weather conditions.

6. In a temperature control system for controlling the operation of a space conditioning device in response to space temperature and varying the space temperature in accordance with a selected schedule as outdoor weather conditions change, space temperature responsive switch means, connection means adapted to connect said switch means to control the space conditioning device, first heating means for heating said temperature responsive means, second temperature responsive switch means, second heating means adapted for heating said second temperature responsive switch means, said second switch means and its heating means being mounted as a unit outdoors so that its heat loss is a function of outdoor weather conditions, a source of power, connection means including said second switch means connecting said second heating means to said source so that said unit is maintained at a selected temperature and the percent on time of said second switch means depends upon the outdoor temperature, the wind velocity, and heat radiation from the sun, connection means connecting said first heating means in parallel with said second switch means so that each time said second switch is open heat is applied to said space temperature responsive means to reset the space temperature as a function of outdoor weather conditions.

7. In a temperature control system for controlling the operation of a heat supplying device, an outdoor unit comprising a temperature responsive actuated switch and an electric heater, a source of power, and means including said switch for connecting said electric heater to said source of power so that said outdoor unit is maintained at a predetermined temperature above the variable outdoor temperature and the percent on time of said switch is dependent upon the outdoor temperature, wind velocity, and sun seat, an indoor unit comprising a second temperature responsive actuated switch and a second electric heater, connection means including said second switch adapted to connect said heat supplying device to said source of power so that heat is supplied to the space to maintain it at a selected temperature, and connection means connecting said second heater in parallel with said switch of said outdoor unit so that heat is supplied to said indoor unit each time said outdoor unit heater is de-energized thus the indoor temperature is controlled along a schedule depending upon outdoor weather including outdoor temperature, wind velocity and sun heat.

8. In a cooling system, the combination of an indoor thermostat adapted to actuate a cooling unit at a predetermined degree of temperature, a heating element disposed adjacent said indoor thermostat for maintaining the same above indoor temperature, an outdoor thermostat including a pair of contacts having a tendency to close as the temperature of said outdoor thermostat is decreased, a resistor disposed adjacent said outdoor thermostat for periodically opening said pair of contacts and permitting the same to close, said heating element being connected in series with said resistor, and a source of current connected to the series combination of said pair of contacts of the outdoor thermostat and said resistor and said heating element, whereby the heating element may be energized when the outdoor thermostat contacts are closed and whereby the fraction of time when the outdoor thermostat contacts are closed is increased in response to a decrease in outdoor temperature.

9. The heating system as defined in claim 4 wherein said auxiliary impedance comprises a resistive element.

10. The heating system as defined in claim 4 wherein said auxiliary impedance comprises a reactive element.

11. In a heating system, the combination of an indoor thermostat adapted to actuate a heating unit at a predetermined degree of temperature, a heating element disposed adjacent said indoor thermostat for maintaining the same at a point above indoor temperature, an outdoor thermostat including a pair of contacts having a tendency to close as the temperature of said outdoor thermostat is reduced, a resistor disposed adjacent said outdoor thermostat for periodically opening said pair of contacts and permitting the same to close, a current source including a transformer of high leakage reactance, said heating element being connected across said transformer, said pair of contacts of said outdoor thermostat and said resistor being connected in series across said heating element, whereby the heating element may be more intensely energized when the outdoor thermostat contacts are open and whereby the fraction of time when the outdoor thermostat contacts are open is increased in response to an increase in outdoor temperature.

References Cited in the file of this patent

UNITED STATES PATENTS

| | | |
|---|---|---|
| 2,168,178 | Thompson | Aug. 1, 1939 |
| 2,240,390 | Chappell | Apr. 29, 1941 |
| 2,339,635 | Hall | Jan. 18, 1944 |
| 2,732,132 | Hulett | Jan. 24, 1956 |

FOREIGN PATENTS

| | | |
|---|---|---|
| 711,150 | France | June 23, 1931 |
| 57,237 | Netherlands | Apr. 15, 1946 |
| 219,187 | Switzerland | Jan. 31, 1942 |